UNITED STATES PATENT OFFICE.

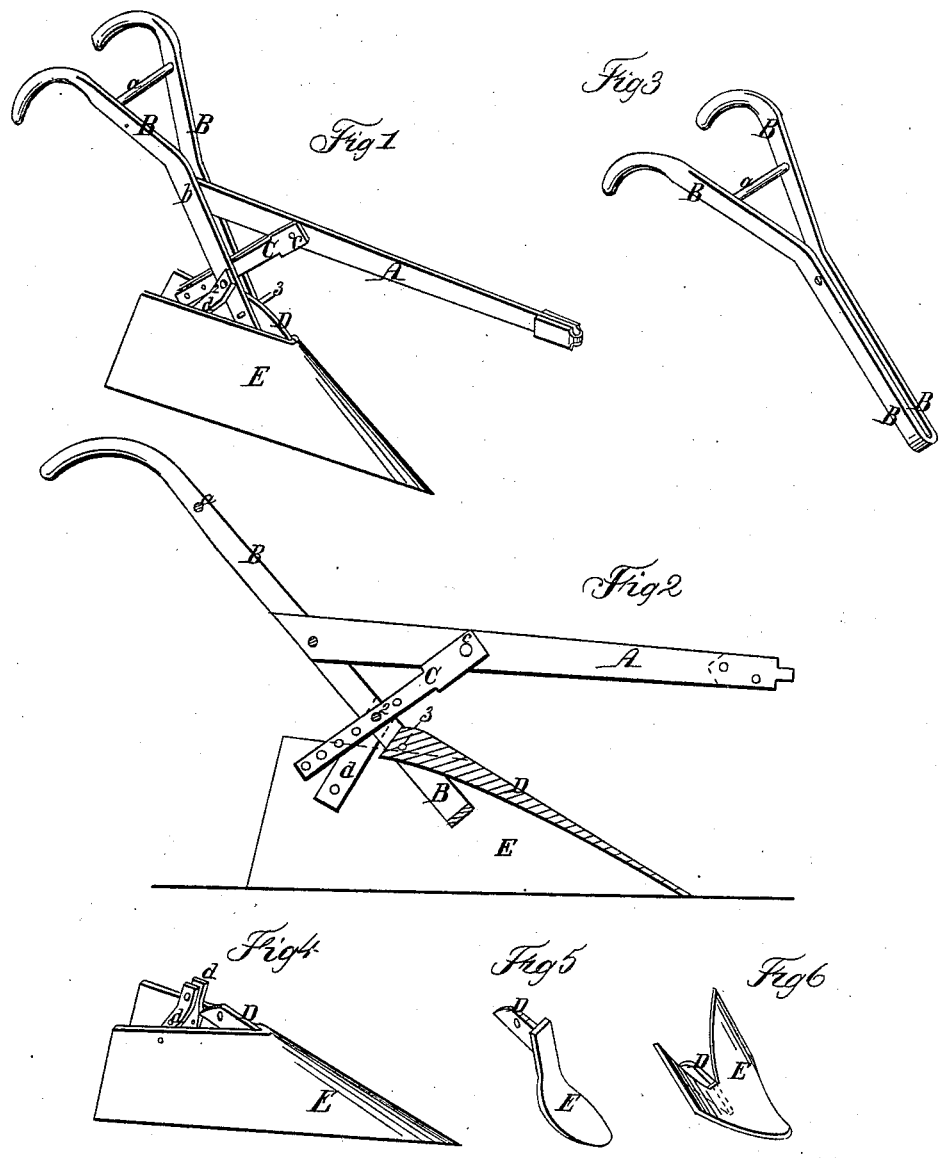

MATTHEW C. McCULLERS, OF HERNDON, GEORGIA.

IMPROVEMENT IN PLOWS.

Specification forming part of Letters Patent No. 29,184, dated July 17, 1860.

*To all whom it may concern:*

Be it known that I, MATTHEW C. McCULLERS, of Herndon, in the county of Burke and State of Georgia, have invented certain new and useful Improvements in Plows; and I do hereby declare that the following is a full, clear, and exact description of the construction of the same, reference being had to the accompanying drawings, making a part of this specification, in which—

Figure 1 represents a perspective view of one of my plows complete. Fig. 2 represents a section through the same. Figs. 3 and 4 represent the handles and the mold-board detached from each other, and Figs. 5 and 6 represent different forms of mold-boards which may be substituted for that shown in Figs. 1, 2, 4.

Similar letters of reference, where they occur in the several figures, denote like parts in all the drawings.

I propose to make my plow entirely of iron, though small portions may be made of wood—as, for instance, the upper ends of the handles; and my invention relates to the special manner in which I unite the several parts so as to make it cheap, strong, easily adjusted, and susceptible of receiving such mold-boards as the necessities of the user, or of the crop, or of the special work to be done may require.

To enable others skilled in the art to make and use my invention, I will proceed to describe the same with reference to the drawings.

The beam A may be a plain straight bar, slightly tapered from heel to point, and the handles B may be one piece also, bent around as shown in Fig. 3, and braced by a rung, *a*. The heel of the beam and the handles are bolted together at *b*; and a brace, C, extends from the beam at *c* backward and downward, and, passing between the bars that form the handles, is bolted thereto by a pin or bolt, 2, passing through one of the adjusting-holes in said brace C and through the handles.

D is a ridge-brace, the upper end of which passes between the handle-bars and is bolted thereto by a bolt or pin, 3. This ridge-brace extends down underneath or behind the mold-board E, the angle or bend of the mold-board resting upon it, and tapers off from its upper to its lower end.

To the wings or side of the mold-board are pivoted straps or bars *d*, which extend upward and are fastened to the handles by the same bolt or pin, 2, that bolts the brace and handles together, as above described.

The plow may be set deep or shallow by means of the pin 2, brace C, and the pivoted straps *d*, and in any of its adjusted positions all the parts are firmly and rigidly united.

The plow-stock, when the mold-board E is removed from it, may be used for other plows and other purposes.

Having thus fully described the construction of my plow, what I claim as new, and desire to secure therein by Letters Patent, is—

Securing the beam, handles, and mold-board together by means of the braces C D, straps *d*, and pins or bolts 2 3, the whole being constructed, arranged, and united substantially in the manner herein set forth and explained.

MATTHEW C. McCULLERS.

Witnesses:
 NOAH ADAMS,
 MILTON H. LEWIS.